United States Patent [19]

Huneycutt

[11] 4,430,985
[45] Feb. 14, 1984

[54] THERMOSTATICALLY CONTROLLED CHARCOAL COOKER

[76] Inventor: Robert C. Huneycutt, 703 Dryden Cir., Stillwater, Okla. 74074

[21] Appl. No.: 343,453

[22] Filed: Jan. 28, 1982

Related U.S. Application Data

[63] Continuation of Ser. No. 99,405, Dec. 3, 1979, abandoned.

[51] Int. Cl.³ ............................................... F24B 3/00
[52] U.S. Cl. ............................... 126/25 A; 126/25 R; 126/15 R; 126/290
[58] Field of Search ................ 126/1 AD, 10, 11, 14, 126/15 R, 21 R, 25 R, 25 A, 25 AA, 41 R, 285 R, 289, 290, 77; 236/6, 15 A, 16, 45; 99/480, 482

[56] References Cited

U.S. PATENT DOCUMENTS

| | | | |
|---|---|---|---|
| 1,840,474 | 1/1932 | Spiker | 126/293 |
| 2,349,617 | 5/1944 | Gorman | 126/15 R |
| 2,388,829 | 11/1945 | Cheasley | 126/15 R |
| 2,742,892 | 4/1956 | Herzer | 126/25 R |
| 2,867,208 | 1/1959 | True et al. | 126/25 R |
| 3,500,812 | 3/1970 | Korngold | 126/25 R |
| 3,951,335 | 4/1976 | Kemp | 236/15 A |

Primary Examiner—Lee E. Barrett
Attorney, Agent, or Firm—Head, Johnson & Stevenson

[57] ABSTRACT

A charcoal cooker comprising a vessel having a lid providing for access to the interior of the vessel, a removable rack for supporting food during a cooking operation, a fire box adjustably disposed within the vessel and spaced below the rack for supplying heat during the cooking operation, and thermostatically actuated valves provided for the vessel and responsive to the internal temperatures in the cooker for alternately opening and closing to automatically maintain a preselected temperature within the vessel during an entire cooking operation.

7 Claims, 3 Drawing Figures

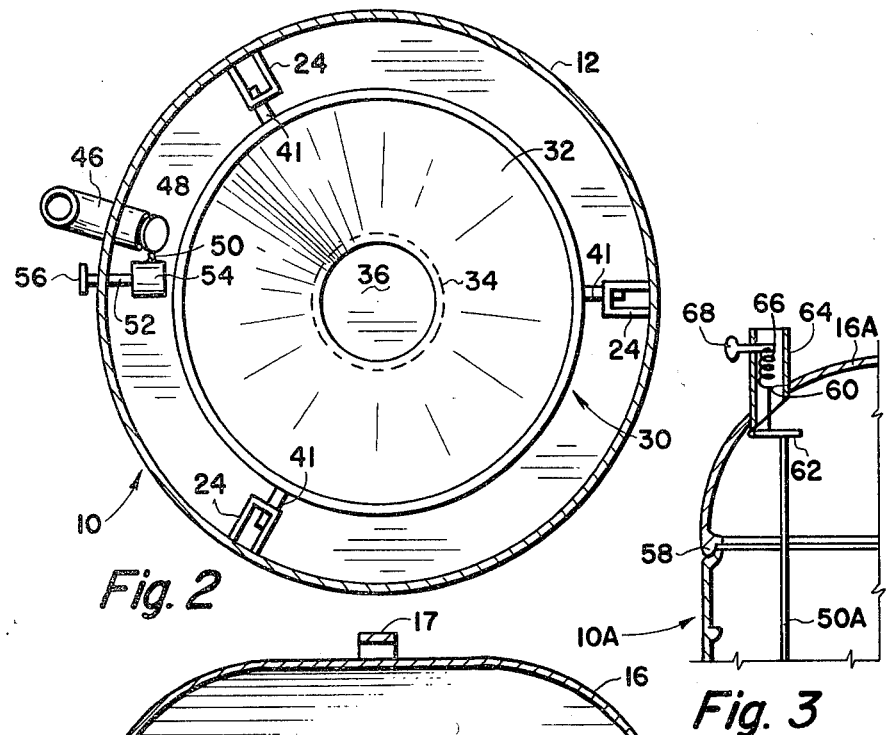
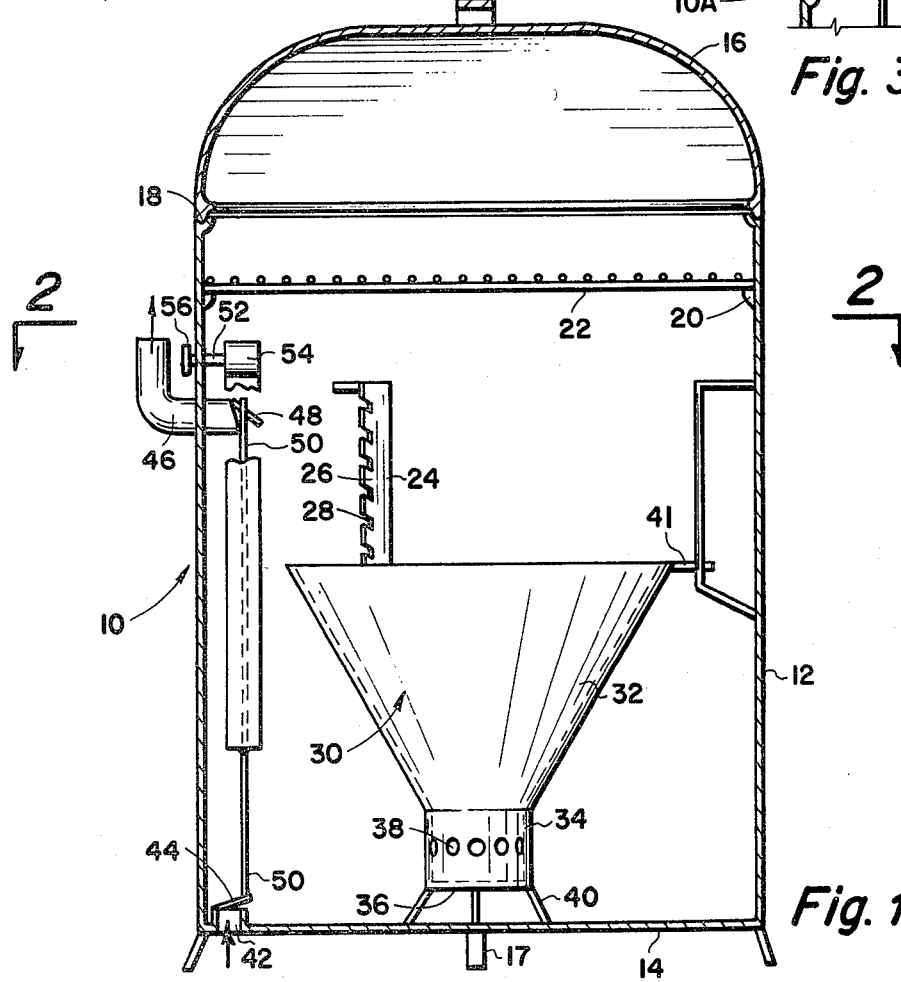

THERMOSTATICALLY CONTROLLED CHARCOAL COOKER

This is a continuation of application Ser. No. 99,405, filed Dec. 3, 1979, now abandoned.

BACKGROUND OF THE INVENTION

1. Field of the Invention

This invention relates to improvements in charcoal type cookers and more particularly, but not by way of limitation, to a charcoal cooker having the internal temperatures thereof thermostatically controlled during a cooking operation.

2. Description of the Prior Art

Outdoor cooking vessels are in widespread use today for the preparation of many food products, such as charcoal cooking, smoking of foods, and the like. The cooking temperatures of the usual present day cooker or smoker cannot be preselected and accurately controlled throughout the cooking cycle, and as a consequence the preparation or cooking of the food normally requires close surveillance and tending of the burning fuel during the cooking cycle. In addition, any excess charcoal or other fuel remaining after the cooking cycle has been completed usually continues to burn, often without attendance, which may result in accidental fire, causing a hazard to life and property. Furthermore, the burning of the excess quantity of fuel is wasteful, and in some instances the coals may be drenched with water or the like, for quenching thereof, but this is a messy and time consuming operation, and the coals must be thoroughly dried before they may be reused, and the drying operation may be inconvenient. It is also found that large pieces of food, such as a turkey, ham, or the like, is frequently improperly cooked in the present day cookers in that when the heat is too high the outer portions of the meat tend to be overcooked while the center part is undercooked or perhaps may be raw. Of course, when the heat is too low, the cooking process is usually totally ineffective or improper. The disadvantages of the many problems in the presently available charcoal cookers, and the like, will be readily apparent.

SUMMARY OF THE INVENTION

The present invention contemplates a novel charcoal-type cooker particularly designed and constructed for overcoming these disadvantages. The novel vessel comprises a receptacle having a lid thereof providing for access to the interior thereof, and a removable grill or rack disposed within the vessel for supporting the food during the cooking operation. A firebox is adjustably secured within the receptacle and spaced below the rack for providing the cooking heat, as is well known. A pair of gate valves, or the like, are provided in the walls of the vessel and are in spaced relation whereby one of the valves is disposed in the proximity of the lower portion of the vessel and the other of the valves is in the proximity of the upper portion thereof. The valves provide communication between the interior and exterior of the vessel and are each operably connected with a suitable heat sensitive spring which opens and closes the valves in accordance with the internal temperature of the vessel, thus maintaining an accurate control of the internal temperature during a cooking operation, said control being maintained independent of any manual attendance of the vessel. The novel vessel is simple and efficient in operation and economical and durable in construction.

BRIEF DESCRIPTION OF THE DRAWINGS

FIG. 1 is sectional elevational view of a charcoal cooker embodying the invention, with portions thereof being depicted in elevation for purposes of illustration.

FIG. 2 is a view taken on line 2—2 of FIG. 1.

FIG. 3 is a broken sectional view of a portion of modified charcoal cooker embodying the invention.

Referring to the drawings in detail, and particularly FIGS. 1 and 2, reference character 10 generally indicates a cooking vessel comprising a receptacle 12 having the lower end thereof closed by a wall or plate 14 and the upper end thereof open for receiving a suitable lid or cover 16 thereon. The vessel 10 is supported above the surface of the ground or the like by a plurality of suitable legs 17. The lid 16 may be either hingedly secured to the open upper end of the housing or receptacle or may be completely removable with respect thereto, as desired, and provides a dual function, namely for closing the vessel 10 during a cooking operation and for providing access to the interior of the receptacle 12 as required, and as well known. It is preferable to provide a suitable handle 17 for the lid 16 to facilitate manipulation thereof. The open upper end of the receptacle 12 is referably provided with a circumferentially extending recess 18 for snugly receiving the complementarily configured lower end of the lid 16 therein whereby an air-tight seal is provided between the lid 16 and receptacle 12 during a cooking operation, as will be hereinafter set forth. In addition, an annular shoulder 20 is provided on the inner periphery of the receptacle 12 and spaced inboard of the open upper end thereof for removably supporting a suitable rack or grid 22 thereon whereby food to be cooked may be placed on the outer surface of the grid 22 during a cooking operation.

A plurality, preferably three, but not limited thereto, of bracket members 24 are rigidly secured to the inner periphery of the receptacle 12 spaced below the shoulder 20 and disposed in circumferentially spaced relation as clearly shown in the drawings. Each bracket 24 is provided with an inwardly directed portion 26 having plurality of longitudinally spaced grooves or recesses 28 therein with the grooves 28 of all of the brackets 24 being in substantial alignment for adjustably supporting a fire box 30. The firebox 30 as shown herein comprises a substantially frusto-conical housing 32 having the larger end thereof open in the direction of the rack 22 and the smaller end thereof open to a cylindrical housing 34. The outer end of the housing 34 has a grate or ported bottom plate 36 and a plurality of ports or apertures 38 are circumferentially spaced around the sidewalls thereof for a purpose as will be hereinafter set forth. A plurality of support members or legs 40 are secured to the outer end of the housing 34 for supporting the firebox 30 on the inner surface of the plate 14 as shown in FIG. 1. In addition, however, a plurality of circumferentially spaced radially outwardly extending lugs or arms 41 are proved around the outer end of the housing 32 for selective engagement with substantially any of the aligned grooves 28 of the barckets 24 in order to support the firebox 30 within the interior of the receptacle 12 at substantially any desired distance beneath the rack 22 as desired or required during a cooking operation.

An inlet port 42 is provided in the bottom plate 14 for providing communication between the exterior and interior of the receptacle 12, and be alternately opened and closed by a suitable gate valve 44, butterfly valve, sliding valve or the like, operably secured to the inner end thereof, as particularly shown in FIG. 1. Of course, it is to be noted that the inlet port 42 may be disposed in the sidewall of the receptacle 12 in the proximity of the lower end thereof rather than in the plate 14, if desired. An outlet port (not shown) is provided in the sidewall of the receptacle 12 and spaced upwardly from the inlet port 42 for receiving an exhaust conduit 46 therein providing communication between the interior and exterior of the receptacle 12 in the proximity of the upper portion thereof. The exhaust conduit may be of any desired or suitable configuration and as shown herein is preferably a right angle tube having the outer end thereof open to the atmosphere and a suitable gate valve 48, or the like, operably secured to the inner end thereof.

A push-rod or link member 50 is operably connected between the gate valves 44 and 48 whereby reciprocal movement of the rod 50 simultaneously opens and closes the valve 44 and 48. A rod member 52 extends through the sidewall of the receptacle 12, preferably spaced above the exhaust conduit 46, and is journalled in the sidewall in any suitable manner for rotation about its own longitudinal axis. A spring member 54 of a suitable heat sensitive bi-metal construction has one end anchored or secured to the inner end of the rod 50 and the opposite end secured to the link member 50. It may be desirable to secure the spring 55 to the rod 50 at a point spaced below the upper end of the firebox 30 thus positioning the end of the spring below the rising heat from the firebox. A suitable knob 56 is secured to the outer end of the rod 52 and is disposed exteriorly of the receptacle 12 whereby manual rotation of the knob 56 rotates the rod 52 for adjusting the tension or force of the spring 52 as is well known and for a purpose as will be hereinafter set forth.

As hereinbefore set forth, the firebox 30 is of a substantially frusto-conical or funnel shaped configuration having the ports 38 provided around the periphery of the lower end thereof, thus providing a "self-tending" fire within the firebox when used in the manner as will be hereinafter set forth. Of course, the adjustable brackets 24 provide for variation of the distance between the rack 22 and the source of heat from the firebox according to the desired cooking operation, thus providing great flexibility of use for the cooker 10.

In use, an ample quantity of charcoal, or other suitable fuel (not shown) is placed in the firebox 30, and is ignited in any suitable manner, as is well known. The ports 38 admit air into the bed of coals in the proximity of the bottom thereof whereby the coals are burned from the bottom. As the charcoal in the bottom of the firebox burns, ashes fall through the bottom gate or ported plate 36 allowing additional charcoal to fall into the concentrated fire in the bottom of the firebox.

The heat sensitive spring 52 alternately expands and contracts upon temperature change within the interior of the receptacle 12. When the temperature conditions within the receptacle 12 reach a predetermined range, the spring 52 expands for moving the rod or link 50 in a downward direction as viewed in FIG. 1, thus closing both the valves 44 and 48. Of course, the lid 16 is also closed against the upper end of the receptacle, and as the food (not shown) supported on the rack 22 begins to cook the water vapor or steam escaping into the interior of the vessel 10 cooperates with the recess 18 and lid 16 in much the same manner as the well known waterless cooking vessels for maintaining an air tight seal for the vessel during a cooking operation.

When the valves 44 and 48 are closed, the air inside the cooker contains an adequate supply of oxygen to permit the coals to continue burning for a short period of time.

As the temperature inside the vessel 10 cools the spring 52 begins to contract and to open the valves 44 and 48, which regulate the quantity of air available for burning the charcoal or other fuels to produce a hot bed of coals. The rising heat within the air-tight vessel 10 causes the spring 52 to expand thereby closing the valves 44 and 48 which prevent the admission of atmospheric air into the interior of the vessel 10 until the interior temperature falls below the predetermined temperature, whereupon the spring contracts for once again opening the valves 44 and 48, thus maintaining a substantially constant or controlled cooking temperature during a cooking operation.

With the vessel thus in operation, and the fire burning briskly, and the moisture during the preliminary cooking of the food, and particularly meat, will be retained within the vessel, and the water in the receptacle will be boiled to fill the food with steam or very moist heat until the water has been entirely boiled away. This procedure will aid in the meat being kept in a tender and juicy condition.

When a cooking operation has been completed, and the food has been removed from the vessel 10, the lid 16 may be positioned in the closed position against the upper end of the receptacle 12, and the knob 56 may be manually rotated for adjusting the spring 52 for closing of the valves 44 and 48. As hereinbefore set forth, this stops the supply of air and oxygen into the interior of the vessel, and in a short period of time the supply of oxygen will be depleted and the fire in the firebox will be extinguished. This precludes a complete consumption of anu remaining coals, thus permitting the reuse thereof at a future time.

Referring now to FIG. 3, a modified cooker 10A is shown which is generally similar to the vessel 10, and is provided with a lid 16A hingedly secured thereto by a suitable hinge 58, thus precluding a complete separation of the lid 16A from the vessel 10A. An exhaust port 50 is provided in the lid 16A and is provided with a gate valve 62, or the like, at the inner end thereof, and an exhaust conduit 64 extending outwardly from the outer end thereof. A suitable helical spring 66 may be secured within the conduit 64 in any well known manner and operably connected between an actuator knob 68 and the valve 62 for adjusting the pressure or force required for opening of the valve. The valve 62 is suitably connected with a push-rod 50A in the same manner as the valve 48, and the remaining elements of the vessel 10A are substantially identical in structure and operation as that hereinbefore set forth in connection with the vessel 10.

From the foregoing it will be apparent that the present invention provides a novel thermostatically controlled charcoal-type cooker having control valve means operable for automatically maintaining a preselected cooking temperature range within the vessel. In addition, an air-tight condition is provided for the vessel when the control valves are closed for greatly increasing the efficiency of the overall cooking operation. The vessel is quite versatile in operation, providing a wide range of cooking feats, such as the well known barbequeing, slow cooking for large pieces of meat through long period of cooking time without required attendance, smoking, and other such operations. Less expensive cuts of meat will be tenderized by the slow cooking under the intermittent low-steam cooking procedures.

Whereas the present invention has been described in particular relation to the drawings attached hereto, it should be understood that other and further modifications, apart from those shown or suggested herein may be made within the spirit and scope of this invention.

What is claimed is:

1. A thermostatically controlled self-contained charcoal cooker comprising a receptacle having a lid providing access to the interior thereof, rack means removably supported within the receptacle for receiving food thereon to be cooked, a firebox adjustably disposed within the receptacle for providing variable distance between the cooking heat and the food on the rack means, dual valve means providing communication between the interior and exterior of the receptacle for controlling the supply of air to the interior of the cooker, the dual valve means comprising a first valve disposed in an inlet in the proximity of the lower portion of the cooker for controlling the supply of air to the proximity of the lower portion of the firebox, and a second valve disposed in an outlet in the proximity of the upper portion of the cooker for controlling the supply of air thereto, and connector rod means operably connected between the valves for simultaneous opening and closing of the valves, and heat sensitive control means disposed to sense the temperature within the cooker and operably connected with the valve means for opening and closing of the valves for controlling the temperature within the cooker during a cooking operation.

2. A thermostatically controlled self-contained charcoal cooker as set forth in claim 1 wherein the valves are gate valves.

3. A thermostatically controlled self-contained charcoal cooker as set forth in claim 2 wherein the heat sensitive control means is operably connected with the connector rod means for actuation thereof for opening and closing of the valves in response to the internal temperature of the cooker.

4. A thermostatically controlled self-contained charcoal cooker as set forth in claim 1 wherein the heat sensitive control means comprises a bi-metal spring operably connected with the valves and responsive to the internal temperature of the cooker for alternately opening and closing of the valves for controlling the supply of air to the interior of the cooker and maintaining a preselected cooking temperature therein during a cooking operation.

5. A thermostatically controlled self-contained charcoal cooker as set forth in claim 1 wherein the firebox comprises a funnel-shaped container for receiving cooking fuel therein whereby the burning of the fuel is from the bottom of the fuel supply.

6. A thermostatically controlled self-contained charcoal cooker as set forth in claim 5 wherein the firebox is provided with a plurality of apertures in the lower portion thereof for directing oxygen to the bottom of the fuel supply for factilitating the burning of the fuel.

7. A thermostatically controlled self-contained charcoal cooker as set forth in claim 1 and including bracket means secured to the inner periphery of the receptacle for providing said adjustability for the position of the firebox therein.

* * * * *